(12) United States Patent
Kaliski, Jr. et al.

(10) Patent No.: US 10,805,190 B2
(45) Date of Patent: Oct. 13, 2020

(54) NAME COLLISION RISK MANAGER

(71) Applicant: VERISIGN, INC., Reston, VA (US)

(72) Inventors: Burton S. Kaliski, Jr., McLean, VA (US); Allison Mankin, Bethesda, MD (US)

(73) Assignee: VERISIGN, INC., Reston, VA (US)

( * ) Notice: Subject to any disclaimer, the term of this patent is extended or adjusted under 35 U.S.C. 154(b) by 469 days.

(21) Appl. No.: 14/640,755

(22) Filed: Mar. 6, 2015

(65) Prior Publication Data
US 2015/0256424 A1 Sep. 10, 2015

Related U.S. Application Data

(60) Provisional application No. 61/949,176, filed on Mar. 6, 2014.

(51) Int. Cl.
*H04L 12/26* (2006.01)
*G06F 16/903* (2019.01)
*H04L 29/12* (2006.01)

(52) U.S. Cl.
CPC ...... *H04L 43/062* (2013.01); *G06F 16/90335* (2019.01); *H04L 61/10* (2013.01); *H04L 61/1511* (2013.01); *H04L 61/3005* (2013.01); *H04L 61/3015* (2013.01)

(58) Field of Classification Search
CPC ... H04L 43/062; H04L 61/10; H04L 61/1511; H04L 61/3005; H04L 61/3015; G06F 17/30979
USPC ........................................................ 709/224
See application file for complete search history.

(56) References Cited

U.S. PATENT DOCUMENTS

| 2003/0069942 A1* | 4/2003 | Bell | H04L 29/12009 709/218 |
| 2014/0059208 A1* | 2/2014 | Yan | H04L 43/0817 709/224 |
| 2015/0222589 A1* | 8/2015 | O'Connor | G06F 16/95 370/254 |

OTHER PUBLICATIONS

Interisle. Name Collision in the DNS, Version 1.5, Aug. 2, 2013.*
ICANN, "Beijing—New gTLD Security Stability & Resiliency (SSR) Update", ICANN 46, Apr. 2013, pp. 1-62.
FCC, "E9-1-1 best practices, final report", CSRIC III: Working Group, Mar. 2013, pp. 1-110.
Robert Duncan, "How certificate revocation (doesn't) work in practice", Netcraft Blog, May 2013, pp. 1-4.
Danny McPherson, "Part 2 of 5, Internet Infrastructure: Stability at the Core, Innovation at the Edge", Verisign Blog, May 2013, pp. 1-6.

(Continued)

*Primary Examiner* — Tan Doan
(74) *Attorney, Agent, or Firm* — MH2 Technology Law Group, LLP

(57) ABSTRACT

Embodiments relate to systems, devices, and computer-implemented methods for managing domain name space collisions by accessing information, such as a domain name string, corresponding to a domain name resolution request and response. Based on at least the domain name string, a type of use value associated with the request can be determined. Based on at least the type of use value, a name collision risk value for the request can be determined. If the name collision risk value indicates there is a specified risk of a domain name string collision, then a domain name collision mitigation strategy can be generated and/or implemented.

21 Claims, 6 Drawing Sheets

(56) References Cited

OTHER PUBLICATIONS

Brad Hill et al., "RE: Proposed delegation of invalid names from SAC 045 and RFC 6762", Letter to ICANN CEO and Board Chairman, Mar. 2013, pp. 1-2.
NCC Group, ".trust Home", https://whodoyou.trust/, accessed Jun. 2015, pp. 1-4.
AVM, "FRITZ!Box user interface cannot be opened", AVM Knowledge Base, accessed Jun. 2015, pp. 1-7.
Nevil Brownlee et al., "DNS Measurements at a Root Server", GLOBECOM '01, IEEE, vol. 3, 2001, pp. 1672-1676.
S. Cheshire et al., "Special-Use Domain Names", IETF RFC 6761, Feb. 2013, pp. 1-26.
S. Cheshire et al., "Multicast DNS", IETF RFC 6762, Feb. 2013, pp. 1-140.
S. Cheshire et al., "DNS-Based Service Discovery", IETF RFC 6763, Feb. 2013, pp. 1-98.
NSTAC, "NSTAC Report to the President on Communications Resiliency", National Security Telecommunications Advisory Committee, Apr. 2011, pp. 1-104.
T. Dierks et al., "The transport layer security (tls) protocol version 1.2", IETF RFC 5246, Aug. 2008, pp. 1-208.
D. Eastlake et al., "Reserved Top Level DNS Names", IETF RFC 2606, Jun. 1999, pp. 1-6.
Peter Eckersley et al., "An observatory for the ssliverse", Defcon 18, 2010, pp. 1-47.
AVM, "AVM home page", AVM, accessed Jun. 2015, pp. 1-2.
Paul Gauthier et al., "Web Proxy Auto-Discovery Protocol", IETF Internet-Draft, Dec. 1999, pp. 1-26.
E. Gavron, "A Security Problem and Proposed Correction With Widely Deployed DNS Software", IETF RFC 1535, Oct. 1993, pp. 1-6.
Martin Georgiev et al., "The most dangerous code in the world: validating ssl certificates in non-browser software", ACM Conference on Computer and Communications Security, 2012, pp. 38-49.
Saikat Guha et al., "Identity Trail: Covert Surveillance Using DNS", Proceedings of 7th International PETS Symposium, Jun. 2007, pp. 1-14.
Vernita D. Harris, "Addition of New gTLDs to the Root Zone", Letter to Patrick S. Kane, Senior Vice President of Verisign, Aug. 2013, pp. 1-2.
Kelly Jackson Higgins, "New .secure Internet Domain on Tap", Dark Reading, May 2012, pp. 1-12.
ICANN, "Invalid Top Level Domain Queries at the Root Level of the Domain Name System", ICANN SSAC 045, Nov. 2010, pp. 1-10.
ICANN, "Response to the ICANN Board Regarding Interdisciplinary Studies", ICANN SSAC 059, Apr. 2013, pp. 1-5.
Jeff Moss, "ICANN's Apr. Update on SSAC 046 & 057", ICANN Government Advisory Committee Advice, Letter to PatrikFalstrom, Apr. 2013, pp. 1-5.
Patrick S. Kane, "Re: Joint Test Summary Report, RZM 2.0", Letter to Vernita Harris, May 2013, pp. 1-3.
O. Kolkman et al., "A Procedure for Cautious Delegation of a DNS Name", IETF Internet-Draft, Jun. 2013, pp. 1-9.
Eric Osterweil et al., "Managing trusted keys in internet-scale systems", FIST '09, 2009, pp. 1-4.
Patrick S. Kane, "Verisign Comments for New gTLD Board Committee Consideration of GAC Safeguard Advice", ICANN Government Advisory Committee Advice, Apr. 2013, pp. 1-41.
Keith Parkansky, "How to Set Up Linux DNS Services", About Debian, accessed Jun. 2015, pp. 1-33.
J. Rosenberg et al., "SIP: Session Initiation Protocol", IETF RFC 3261, Jun. 2002, pp. 1-252.
F. Templin et al., "Intra-Site Automatic Tunnel Addressing Protocol (ISATAP)", IETF RFC 5214, Mar. 2008, pp. 1-16.
VirtualBox, "Ticket #11649 (new defect) NAT-related crash of ubuntu guest on OSX host", Oracle VM VirtualBox, Mar. 2013, pp. 1-12.
Jon Watson, "Virtualbox: Bits and bytes masquerading as machines", Linux Journal 9941, Feb. 2008, pp. 1-3.
D. Wessels et al., "Wow, That's a Lot of Packets", PAM Workshop, Apr. 2003, pp. 1-9.
Google, "Chrome causes six different DNS requests for random 10 character host names on startup", Google Product Forums, Jun. 2010, pp. 1-2.
Interisle, "Name Collision in the DNS", Interisle Consulting Group, Aug. 2013, pp. 1-197.
JAS, "Namespace Expansion", JAS Advisors, Sep. 2013, pp. 1-2937.
Patrick Kane, "ICANN's Proposal to Mitigate Name Collision Risks—.CBA Case Study", Verisign Labs, Sep. 2013, pp. 1-29.
Wikipedia, "Geolocation software", Wikipedia, accessed Jun. 2015, pp. 1-4.
B. Aboba et al., "Dynamic Host Configuration Protocol (DHCP) Domain Search Option", IETF RFC 3397, Nov. 2002, pp. 1-8.
Grant Bugher, "WPAD: Internet Explorer's Worst Feature", Perimeter Grid, Jan. 2008, pp. 1-11.
Eric Hjelmvik, "WPAD Man in the Middle", Netresec, Jul. 2012, pp. 1-6.
Geoff Huston, "New gTLD Concerns: Dotless Names and Name Collisions", RIPE Labs, Nov. 2013, pp. 1-9.
G. Huston et al., "Using Test Delegations from the Root Prior to Full Allocation and Delegation", IETF Internet-Draft, Oct. 2013, pp. 1-18.
ICANN, "SSAC Advisory on DNS 'Search List' Processing", ICANN SSAC 064, Feb. 2014, pp. 1-8.
S. Krishnan et al., "An Empirical Study of the Performance, Security and Privacy Implications of Domain Name Prefetching", UNC Chapel Hill, 2011, pp. 1-12.
Microsoft, "How DNS Support for Active Directory Works", Microsoft Technet, accessed Jun. 2015, pp. 1-13.
Quantcast, "Top Ranking United States Websites", https://www.quantcast.com/top-sites, accessed Jun. 2015, pp. 1-2.
K. White, "2013 Collisions Project DITL Analysis I DNS-OARC", DNS-OARC, Oct. 2013, pp. 1-2.
ICANN, "Reports for Alternate Path to Delegation Published", ICANN gTLD Announcement, Nov. 2013, pp. 1-2.
Anant Kumar et al., "Common DNS Implementation Errors and Suggested Fixes", IETF RFC 1536, Oct. 1993, pp. 1-24.
ICANN, "New gTLD Collision Risk Mitigation", ICANN gTLD Study, Aug. 2013, pp. 1-4.
Patrick S. Kane et al., "Focused Analysis on New Applied-For gTLDs (Focus: .cba)", Letter to ICANN Board of Directors, Sep. 2013, pp. 1-29.
ICANN, "Mitigating the Risk of DNS Namespace Collisions: Phase One Report", JAS Global Advisors, Feb. 2014, pp. 1-21.
Manos Antonakakis et al., "Building a Dynamic Reputation System for DNS", USENIX Security 2010, Aug. 2010, pp. 1-17.
Paul Vixie, "Taking Back the DNS", CircleID, Jul. 2010, pp. 1-45.
VeriSign, "Managed DNS Features", VeriSign web page, accessed Jun. 2015, pp. 1-6.
VeriSign, "New gTLD Security and Stability Considerations", Verisign Labs Technical Report #1130007, Version 2.2, Mar. 2013, pp. 1-12.
VeriSign, "New gTLD Security, Stability, Resiliency Update: Exploratory Consumer Impact Analysis", Verisign Labs Technical Report #1130008, Version 1.1, Aug. 2013, pp. 1-28.
ICANN, "Guide to Name Collision Identification and Mitigation for IT Professionals", ICANN, Dec. 2013, pp. 1-20.
Warren Kumari et al., "On DNS Search List Processing: Perhaps the Most Misunderstood Staple of DNS Resolution", ICANN Email List Archives, Sep. 2013, p. 1.
Daniel Slane et al., "2010 Report to Congress", US-China Economic and Security Review Commission, Nov. 2010, pp. 1-324.
Anonymous, "The collateral damage of Internet Censorship by DNS Injection", SIGCOMM Comput.Commun. Rev., Jun. 2012, pp. 1-6.
R. Arends et al., "DNS Security Introduction and Requirement", IETF RFC 4033, Mar. 2005, pp. 1-21.
R. Arends et al., "Resource Records for the DNS Security Extensions", IETF RFC 4034, Mar. 2005, pp. 1-29.
R. Arends et al., "Protocol Modifications for the DNS Security Extensions", IETF RFC 4035, Mar. 2005, pp. 1-53.

(56) References Cited

OTHER PUBLICATIONS

CAIDA, "A Day in the Life of the Internet", Center for Applied Internet Data Analysis, accessed Jun. 2015, pp. 1-3.
J. Klensin, "Internationalized Domain Names in Applications (IDNA): Protocol", IETF RFC 5891, Aug. 2010, pp. 1-17.
Danny McPherson, "Uprooting the DNS Root", CircleID, May 2008, pp. 1-6.
George Michaelson et al., "Roll Over and Die?", The ISP Column, Feb. 2010, pp. 1-20.
Paul V. Mockapetris et al., "Development of the Domain Name System", Proceedings of SIGCOMM '88 Computer Communications Review vol. 18, No. 4, Aug. 1988, pp. 1-11.
Ram Mohan, "Will New Top Level Domains (TLDs) Work Everywhere?", Security Week, Aug. 2012, pp. 1-8.
Mozilla, "Mozilla Zone Cuts / Cookie File", Mozilla, accessed Jun. 2015, pp. 1-184.
Jun Murai, "RSSAC Comments on Root Scaling", Letter to ICANN Board of Directors, Nov. 2010, pp. 1-2.
ICANN, "Preliminary Report", ICANN Board meeting, Sep. 2012, pp. 1-18.
Eric Osterweil et al., "Observations from the DNSSEC Deployment", 3rd Workshop on Secure Network Protocols (NPSec), 2007, pp. 1-6.
Eric Osterweil et al., "Operational Implications of the DNS Control Plane", IEEE Reliability Society Newsletter, May 2011, pp. 1-6.
Eric Osterweil et al., "Quantifying the Operational Status of the DNSSEC Deployment", IMC '08, 2008, pp. 1-11.
Eric Osterweil et al., "Interadministrative Challenges in Managing DNS Keys", IEEE Security and Privacy, Sep.-Oct. 2009, pp. 44-51.
Venugopalan Ramasubramanian et al., "Perils of Transitive Trust in the Domain Name System", Proceedings of the 5th ACM SIGCOMM conference, 2006, pp. 1-6.
ICANN, "Report on the Security and Stability Advisory Committee on Root Scaling", ICANN SSAC 046, Dec. 2010, pp. 1-8.
ICANN, "SSAC Advisory on Internal Name Certificates", ICANN SSAC 057, Mar. 2013, pp. 1-17.
A. Sullivan et al., "Asserting DNS Administrative Boundaries Within DNS Zones", IETF Internet-Draft, Mar. 2014, pp. 1-40.
S. Thomson et al., "DNS Extensions to Support IP Version 6", IETF RFC 3596, Oct. 2003, pp. 1-16.
Duane Wessels, "How do validating caches deal with spoofed responses?", Verisign Labs, Oct. 2010, pp. 1-22.
ICANN, "Sunrise Period", ICANN Wiki, Dec. 2011, pp. 1-3.
Earl Zmijewski, "Identity Theft Hits the Root Name Servers", Dyn Research, May 2008, pp. 1-14.
Microsoft, "DNS Namespace Planning", Microsoft Support 254680, accessed Jun. 2015, pp. 1-2.
ICANN, "ICANN", https://www.icann.org/, accessed Jun. 2015, pp. 1-4.
Microsoft, "Naming conventions in Active Directory for computers, domains, sites, and OUs", Microsoft Support 909264, accessed Jun. 2015, pp. 1-7.
Mozilla, "Public Suffix List", Mozilla Wiki, accessed Jun. 2015, pp. 1-3.
Novell, "Novell dns/dhcp services administration guide", Novell, Oct. 2006, pp. 1-205.
Mozilla, "Bug 252342—fix cookie domain checks to not allow .co.uk", Bugzilla©Mozilla, Apr. 2008, pp. 1-23.
Novell, "MAD dnsnaming ?" Novell Forums, Jul. 2008, pp. 1-2.
Geoff Carman, "Diagnosing a 6038 Error in Identity Manager", Novell Support, Jan. 2010, pp. 1-11.
Kevin Murphy, "Google Chrome handles new TLDs badly", Domain Incite, May 2012, pp. 1-3.

ICANN, "New Generic Top Level Domains Applicant Guidebook", ICANN, Jun. 2012, pp. 1-338.
Apple, "Why does iTunes 10.7 try to contact the domain bogusapple.com?", Apple Support Communities, Oct. 2012, pp. 1-5.
Kevin Murphy, "Apple, Google and Microsoft still don't understand new TLDs", Domain Incite, Jan. 2013, pp. 1-4.
European Office Action issued in corresponding European Patent Application No. 15 158 036.2 dated Dec. 3, 2018.
Anonymous: "SAC062—SSAC Advisory Concerning the Mitigation of Name Collision Risk—An Advisory from the ICANN Security and Stability Advisory Committee (SSAC)", Nov. 7, 2013 (Nov. 7, 2013), pp. 1-14, XP055398920, Retrieved from the Internet:URL:https://www.icann.org/en/system/files/files/sac-062-en.pdf [retrieved on Aug. 16, 2017].
Anonymous: "Name Collision in the DNS", Aug. 2, 2013 (Aug. 2, 2013), pp. 1-197, XP055398894, Retrieved from the Internet: URL:https://www.icann.org/en/system/files/files/name-collision-02aug13-en.pdf [retrieved on Aug. 16, 2017].
DNS-OARC, "DITL Traces and Analysis | DNS-OARC", DNS-OARC, https://www.dns-oarc.net/oarc/data/ditl, accessed Jun. 2015, pp. 1-3.
Verisign, "Domain Name System", Verisign, http://www.verisigninc.com/en_US/domain-names/online/domain-name-system/index.xhtml, accessed Jun. 2015, pp. 1-6.
ICANN, "ICANN New gTLDs", ICANN, http://newgtlds.icann.org/en/, accessed Jun. 2015, pp. 1-3.
ICANN, "Addressing the Consequences of Name Collisions", ICANN Announcement, Feb. 2014, pp. 1-5.
Bojan Zdrnja, "Google Chrome and (weird) DNS requests", InfoSec Handlers Diary Blog, Jan. 2011, pp. 1-2.
ICANN, "Alternate Path to Delegation Report for .luxury", ICANN report, Nov. 2013, pp. 1-3.
Wikipedia, "Jaccard Index", Wikipedia, accessed Jun. 2015, pp. 1-4.
DNS-OARC, "2013 DITL Data | DNS-OARC", DNS-OARC, Feb. 2014, pp. 1-2.
ICANN, "Re: Public Comments on Proposal to Mitigate Name Collision Risks, by Google Inc", ICANN Forums, Feb. 2014, pp. 1-18.
P. Mockapetris, "Domain Names—Concepts and Facilities", IETF RFC 1034, Nov. 1987, pp. 1-56.
P. Mockapetris, "Domain Names—Implementation and Specification", IETF RFC 1035, Nov. 1987, pp. 1-56.
R. Braden, "Requirements for Internet Hosts—Application and Support", IETF RF 1123, Oct. 1989, pp. 1-99.
ICANN, "New gTLDdotless domain names prohibited", ICANN Announcement, Aug. 2013, pp. 1-4.
ICANN, "SSAC Report on Dotless Domains", ICANN SSAC 053, Feb. 2012, pp. 1-10.
Extended European Search Report dated Jul. 24, 2015, European Application No. 15158036.2, filed Mar. 6, 2015, pages.
Sebastian Castro et al., "Invalid Top Level Domain Queries at the Root Level of the Domain Name System", SAC045, Nov. 15, 2010, https://www.icann.org/en/system/files/files/sac-0450en.pdf, retrieved Jul. 16, 2015, pp. 1-10.
Grothoff et al., "Special-Use Domain Names of Peer-to-Peer Systems; draft-grothoff-iesg-special-use-p2p-names-02.td", Internet Engineering Task Force, IETF, Standard Working Draft, Internet Society (ISOC) 4, Rue des Falaises CH-1205 Geneva, Switzerland, Mar. 3, 2014, pp. 1-18.
Author Unknown, "New gTLD Collision Occurrence Management", ICANN, Aug. 5, 2013, https://www.icann.org/en/system/files/files/resolution-new-gtld-annex-1-07oct13-en.pdf, retrieved Jul. 16, 2015, pp. 1-8.

\* cited by examiner

FIG. 2

| CLIENT IP | DOMAIN NAME | RESPONSE | TIMESTAMP |
|---|---|---|---|
| 192.0.2.10 | WWW.EXAMPLE.COM | IP = 192.0.2.100 | 1/1/2014 12:01 |
| 192.0.2.10 | WWW.EXAMPLE | NXDOMAIN | 1/1/2014 12:02 |
| 192.0.2.20 | WPAD.SERVER1.EXAMPLE | NXDOMAIN | 1/1/2014 12:03 |
| 192.0.2.20 | WPAD.SERVER2.EXAMPLE | NXDOMAIN | 1/1/2014 12:04 |

FIG. 4

| CLIENT IP | DOMAIN NAME | ASSESSMENT | ACTION |
|---|---|---|---|
| 192.0.2.10 | WWW.EXAMPLE.COM | EXTERNAL USE | NO CHANGE |
| 192.0.2.10 | WWW.EXAMPLE | MISCELLANEOUS | NO CHANGE |
| 192.0.2.20 | WPAD.SERVER1.EXAMPLE | INTERNAL USE | RESERVE |
| 192.0.2.20 | WPAD.SERVER2.EXAMPLE | INTERNAL USE | RESERVE |

NAME COLLISION RISK MANAGER

CROSS-REFERENCE TO RELATED APPLICATION

This application claims priority to and the benefit of U.S. Provisional Patent Application No. 61/949,176, titled "NAME COLLISION RISK MANAGER AND/OR MITIGATION STRATEGY", filed on 6 Mar. 2014, which is hereby incorporated by reference.

BACKGROUND

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 192.0.2.1, and assigned to computers on the Internet. Each domain name can be made up of a series of character strings (e.g., labels) separated by dots. The right-most label in a domain name is known as the top-level domain ("TLD"). Examples of well-known TLDs are .COM; .NET; .ORG; and the like.

TLDs are generally either based on designated country codes (so called "ccTLDs") such as .US; or are generic ("gTLDs") as in the examples above. The available gTLDs had been restricted in the past, but many such restrictions have since ended, potentially allowing companies and organizations to create and use gTLDs that previously were not allowed and/or did not exist.

While there are many positive benefits to the expansion of gTLDs, the change also carries certain risks. For example, there is now a potential for different client devices in the DNS to use the same domain name to refer to two different resources (e.g., to two different IP addresses), which may be referred to as a domain name collision. In particular, the expansion of gTLDs raises the possibility of domain name collisions between new, post-expansion gTLD domain names intended and registered for global use and the same or similar gTLD domain names intended and previously put in place for local use under the past gTLD restrictions when there was no danger of the same global domain name being registered and implemented. Similar risks could also occur if the set of ccTLDs were changed.

The name collision risk is a result of the standard DNS resolution process. During the DNS resolution process, the default process for resolving a domain name treats any domain name as a global domain name. If the domain name does not resolve (e.g., does not exist) in the global name space, then the domain name system looks up the domain name within the local name space after failing to find it in the global name space. Before the gTLD expansion, this process correctly resolved any non-standard TLDs (e.g. TLDs other than .COM; .NET; .ORG, etc.) into the local name space that supported them.

In the present DNS with post-expansion gTLDs, however, a domain name intended for and previously implemented for local use may be identical to a newly created global domain name that includes a post-expansion gTLD, or in other words there may be a "collision" between an existing, local domain name that includes a particular TLD and the same, new, global domain name that includes the same TLD. For such a colliding domain name prior to the creation of the new global domain name, the DNS resolution process would have consistently retrieved the intended local result; but after the creation of the new global domain name in the global name space, the DNS resolution process would thereafter retrieve the unintended new global domain name. This could lead to many problems for legacy systems that rely on failure of global DNS resolution as a lead-in to successful local resolution, including, for example, failures such as system errors, system failures, and/or security risks.

As an example, the domain name gTLD suffix .CORP is often used to designate internal resources within a corporate network. Applications and users may refer to internal resources with shorthand domain names such as SERVER1.CORP or PRINTER2.CORP. These domain names are intended and designed in this example to be resolved locally within a given corporate network. If the corporate network is within the name space EXAMPLE.COM, for instance, then the full version of the domain name may be SERVER1.CORP.EXAMPLE.COM and PRINTER2.CORP.EXAMPLE.COM. As part of the standard DNS resolution process, the shorthand domain name SERVER1.CORP, because it contains an embedded dot delimiter ("."), is first looked up in the global DNS. Only after the global DNS returns a non-existent domain ("NX-DOMAIN") error indicating that SERVER1.CORP does not exist globally is the domain name resolved locally within EXAMPLE.COM. This worked correctly before the gTLD expansion in the global DNS space, because there was no .CORP gTLD and the conventional DNS resolution process always returned an error. (Note that although .CORP is specified for purposes of illustration in this disclosure, .CORP, although proposed as a new gTLD, is not currently being added as a new gTLD because of name collision risks.

In a post-expansion gTLD environment, it is possible to have a .CORP gTLD, where the gTLD .CORP may be added as a new global domain name space and resolved in a conventional manner by the DNS resolution process. In the post-expansion gTLD environment, if SERVER1.CORP does exist globally, then the DNS resolution process would resolve the domain name globally, instead of returning an error, and consequently would not be resolved locally. Thus, the local-resolution design that formerly worked correctly would no longer do so when the local and global names collide—i.e., when they are the same.

Accordingly, it is desirable to develop methods, systems, and computer readable media for assessing the risks of domain name collisions and providing strategies for mitigating domain name collisions.

SUMMARY

The present disclosure relates to systems, devices, and methods for monitoring domain name collision risks and/or providing strategies to mitigate domain name collisions.

Implementations of the present teachings relate to methods, systems, and computer-readable storage media for managing domain name space collisions by accessing information, such as a domain name string, corresponding to a domain name resolution request and/or response. Based on at least the domain name string, a "type of use" value associated with the domain name can be determined. Based on at least the type of use value, a name collision risk value for the domain name resolution request can be determined. If the name collision risk value indicates there is a risk of a domain name string collision, a domain name collision mitigation strategy can be generated and/or implemented.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings:

FIG. 2 is a diagram depicting an example of a query log, consistent with certain disclosed embodiments;

FIG. 4 is a diagram depicting an example of a mitigation strategy, consistent with certain disclosed embodiments;

DETAILED DESCRIPTION

Figure 1:
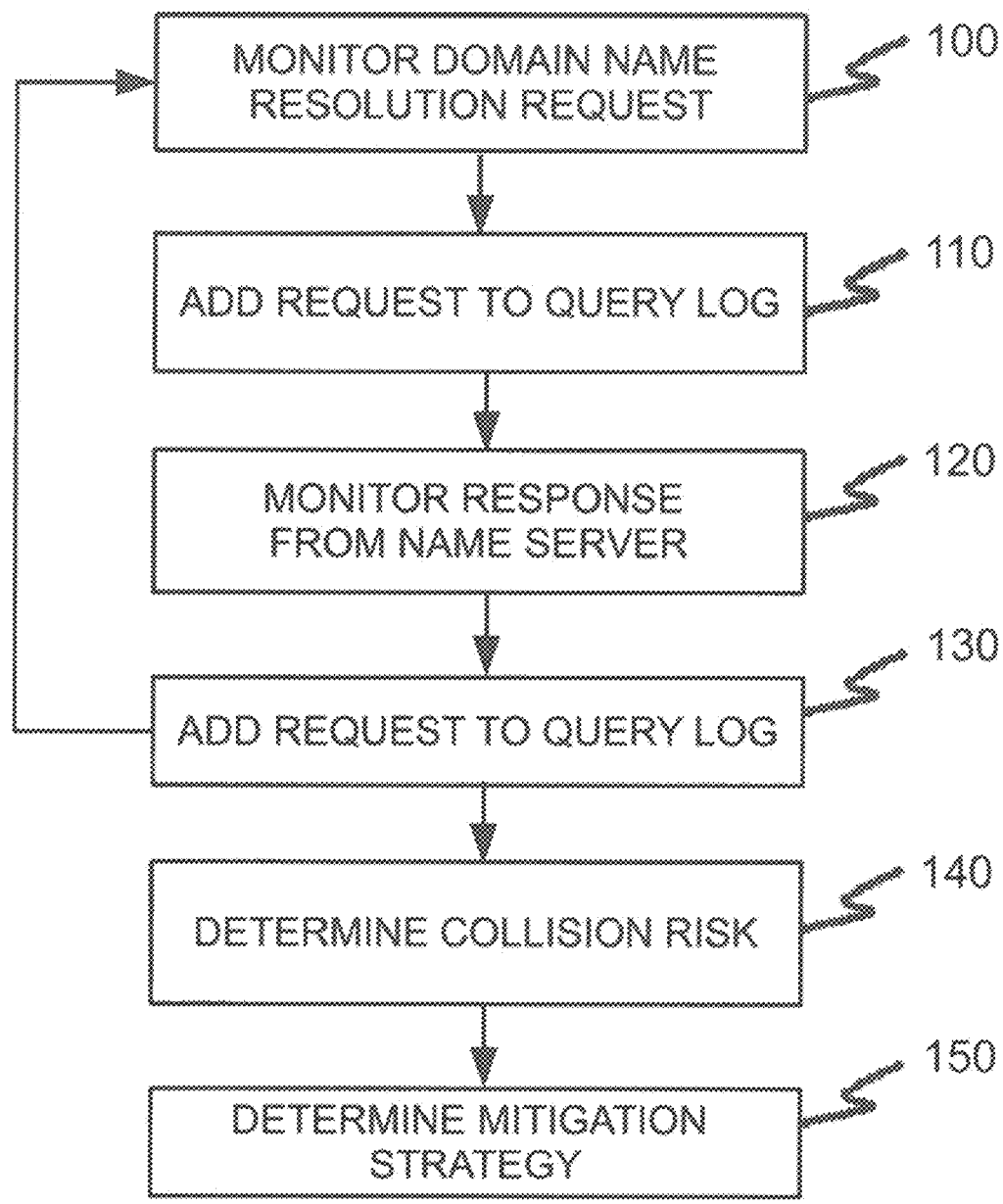
FIG. 1 is a flow diagram illustrating an example of a method of monitoring domain name resolution requests and responses and maintaining a query log, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a flow diagram illustrating an example of a method of monitoring domain name resolution requests and responses and maintaining a query log, consistent with certain disclosed embodiments. The method can be performed on a computing device, such as, for example, a client device, a name server, or a risk management server. In some implementations, a client device can be, for example, a personal computer, a tablet computer, a mobile device, a camera, a printer, an appliance, or any other device with a network connection capable of initiating a domain name resolution request. In other implementations, the client device can be a network device, such as, for example, a router, a wireless base station, a wireless access device, a hub, a network switch, or any other device that can receive an initial domain name resolution request and process or transfer the request to a different network (e.g., from a local network to the Internet).

In some embodiments, a name server can be a DNS authoritative name server that provides responses to domain name resolution requests for one or more domain name zones. In other embodiments, the name server can be a DNS recursive name server that maintains a cache of domain name resolutions and can respond to resolution requests that are already cached or relay resolution requests that are not cached to an authoritative name server.

In some implementations, a risk management server can be a computing device that performs methods and operations as described herein, such as monitoring domain name resolution requests and responses to and from a name server or a client device, determining name collision risks, determining mitigation strategies, and providing mitigation strategies to a name server, an administrator device, and/or a client device. In various embodiments, the risk management server can be operated by the owner of the client device, by an organization associated with the name server, or by a third party.

In some implementations that utilize a third party risk management server, the third party server may only receive domain name request/response data that is selected for analysis, may receive anonymized data (e.g., replacing source IP addresses with tokenized values), may receive data over a different protocol than conventional DNS (e.g., Hypertext Transfer Protocol (HTTP)), may receive additional data that is not generally transferred via DNS protocol, etc.

As shown in FIG. 1, the example of a method can begin in 100, when the computing device monitors a domain name resolution request. In various embodiments, the domain name resolution request can include at least the domain name to be resolved and a source IP address of the requester. The computing device can monitor the domain name resolution request by, for example, generating an indication or representation of the domain name resolution request as part of or in response to an initial domain name resolution request, determining whether a domain name resolution request was received, analyzing packets between devices and determining whether a domain name resolution request is included in a packet, or receiving an indication that a domain name resolution request was transferred or received (e.g., individually or as a batch of information). As an example, a batch of information can be transferred or received as a packet capture ("PCAP") file. In various implementations, information such as a PCAP file may come from a name server, a networked device, or a client device.

In 110, the computing device can add information describing or otherwise related to the domain name resolution request to a query log. For example, the computing device can add an entry in a table for the domain name resolution request, and the entry can include information such as, but not limited to, the IP address of the requester, the domain name being requested, and a timestamp for the request. The timestamp can represent, for example, the time at which the request was monitored by the computing device and/or the time at which the request was initially generated. An example of a query log is shown in FIG. 2.

In some embodiments, the query log can be implemented as one or more files stored on the computing device or/and can be stored on a remote server. In embodiments that use a remote server, the remote server can include a central database for the query log, which can be accessed by multiple devices monitoring domain name resolutions.

In 120, the computing device can monitor a response to the domain name resolution request that comes, for example, from a DNS name server. In various embodiments, the response can include at least the domain name to be resolved, the IP address associated with the domain name (e.g., the IP address that the domain name resolves to) or an error message (e.g., NXDOMAIN), and a destination IP address of the requester. More generally, the methods described here can also apply when the response includes a DNS resource record associated with the domain name, including a DNSSEC-related record or a DANE (DNS-Based Authentication of Named Entities) record. The IP address can be an example record corresponding to an A or AAAA (quad-A) record. The computing device can monitor the response by, for example, generating an indication of the response as part of or in response to looking up the IP address associated with the domain name and/or initiating the response, determining whether a response was received, analyzing packets between devices and determining whether a response is included in a packet, or receiving an indication that a response was transferred or received (e.g., individually or as a batch of information).

In 130, the computing device can add information describing or otherwise related to the response to the domain name resolution request to the query log. For example, the computing device can add an entry in a table for the response, and the entry can include information such as, but not limited to, a timestamp for the response and details about the response. The timestamp can represent, for example, the time at which the response was monitored by the computing device and/or the time at which the response was initially generated. Details about the response can include, but are not limited to, the IP address associated with the domain name in the request or an error message that resulted from the request (e.g., an NXDOMAIN response). In some embodiments, the computing device can add information to a preexisting entry that was previously created based on the request that resulted in the response, for example as described with respect to 110.

In some embodiments, the computing device can repeat 100-130 to process a multitude of DNS requests and responses. The computing device can then proceed to 140 after, for example, repeating 100-130 until a predetermined amount of time has passed, a predetermined number of requests/responses have been monitored, an entire batch has been processed, or a specific event occurs. In other embodiments, the computing device can proceed to 140 each time a request/response is added to the query log. For example, the methods described in FIGS. 1 and 3 can be performed in an active DNS, where determining the risk of a domain name collision 140 and determining a strategy for mitigating name collisions 150 occur in real-time and/or in response to individual domain name resolution requests.

In 140, the computing device can determine the risk of a domain name collision. In various embodiments, a name collision risk refers to a likelihood, probability, or risk that a domain name intended for local resolution could instead be resolved globally. For example, a local area network can be within the name space EXAMPLE.COM, and client devices within the local area network can use shorthand domain names such as SERVER.CORP, which are intended to be resolved locally within EXAMPLE.COM. In other words, the full version of the domain name may be SERVER.CORP.EXAMPLE.COM. If the SERVER.CORP domain name is created in the global name space, a request in the local area network for SERVER.CORP could unintentionally be transmitted out of the local area network and resolved globally by the DNS, returning an unexpected valid global name space response. Accordingly, there is a name collision risk with using the shorthand SERVER.CORP, and the risk increases upon the creation of a global .CORP TLD and/or the global domain name SERVER.CORP. In some implementations, the name collision risk can be represented as a value, as discussed below with regard to FIG. 3.

In 150, the computing device can determine a strategy for mitigating name collisions. In various embodiments, a mitigation strategy may be a table or list that includes information, actions, or instructions relating to how to process domain name resolution requests for specific domain names or parts thereof. For example, a mitigation strategy can be a table that includes a column for domain names and a column for instructions or action(s). Examples of instructions or action(s) can include: resolving the domain name normally, resolving the domain name globally, reserving the domain name for local use, resolving the domain name locally, etc. An example of a mitigation strategy table is shown in FIG. 4. Both determining name collision risks and determining mitigation strategies are discussed in further detail below.

While the operations depicted in FIG. 1 have been described as performed in a particular order, the order described is merely exemplary, and various different sequences of operations can be performed, consistent with certain disclosed embodiments. Additionally, the operations are described as discrete operations merely for the purpose of explanation, and, in some embodiments, multiple operations may be performed simultaneously and/or as part of a single computation. For example, the computing device may receive an indication of a request and a response to the request simultaneously, and/or the computing device may add information related to the request and information related to the response to the query log simultaneously. Further, the steps described are not intended to be exhaustive or absolute, and various operations can be inserted or removed.

FIG. 2 is a diagram depicting an example of a query log, consistent with certain disclosed embodiments. In particular, FIG. 2 depicts a table 200 that includes four entries, with one entry on each of the second through fifth rows. Each entry represents a domain name resolution request and response. In some implementations, the entries can represent entries added during operations 110 and 130 shown in FIG. 1.

Table 200 includes four columns 210-240, each representing information associated with a domain name resolution request/response. Column 210 represents the IP address of a client device that requested the resolution of a domain name. The IP address of the client address can be determined based on either the request (e.g., the source IP address included in the request) or the response (e.g., the destination IP address included in the response). In the example shown in table 200, the first two entries (rows two and three) represent a client device having the IP address 192.0.2.10 and the last two entries represent a client device having the IP address 192.0.2.20.

Column 220 represents the domain name associated with the request/response. The domain name can be determined based on the request, e.g., the domain name in column 220 may be taken or derived from the content of the request. In some embodiments, the domain name may also be determined based on the response, e.g., the domain name in column 220 taken or derived from the content of the response. In the example shown in table 200, IP address 192.0.2.10 transmitted two domain name resolution requests, one for WWW.EXAMPLE.COM and one for WWW.EXAMPLE. IP address 192.0.2.20 also transmitted two domain name resolution requests, one for WPAD.SERVER1.EXAMPLE and one for WPAD.SERVER2.EXAMPLE.

Column 230 contains information about the responses to the resolution requests. The response information can be determined based on the response, e.g., the response information shown in column 230 may be taken or derived from the content of the DNS response. In the example shown in table 200, WWW.EXAMPLE.COM was associated with the IP address 192.0.2.100, which was the response to the resolution request created by the DNS resolution process. WWW.EXAMPLE, WPAD.SERVER1.EXAMPLE, and WPAD.SERVER2.EXAMPLE were not able to be resolved globally and the response from the DNS resolution process for each was an NXDOMAIN error.

Column 240 represents timestamps associated with the domain name resolution requests, the responses, or a combination of both. For example, the initial request may be time stamped, and the timestamp can be determined by a computing device when the request is received and entered into the table 200. In an additional example, the response may be time stamped by an authoritative or recursive name server when resolving the domain name, and the timestamp can be copied from the response by a computing device when the response is received and its information is entered into the table 200. In a further example, a computing device can create a timestamp for each entry when the request is entered into the table 200, when the response is entered into the table 200, or both.

While table 200 shows a particular storage architecture and information, such architecture and information is merely exemplary and different storage types and methods may be used, and different information associated with the requests and/or responses may be entered, as is consistent with disclosed embodiments.

Figure 3:
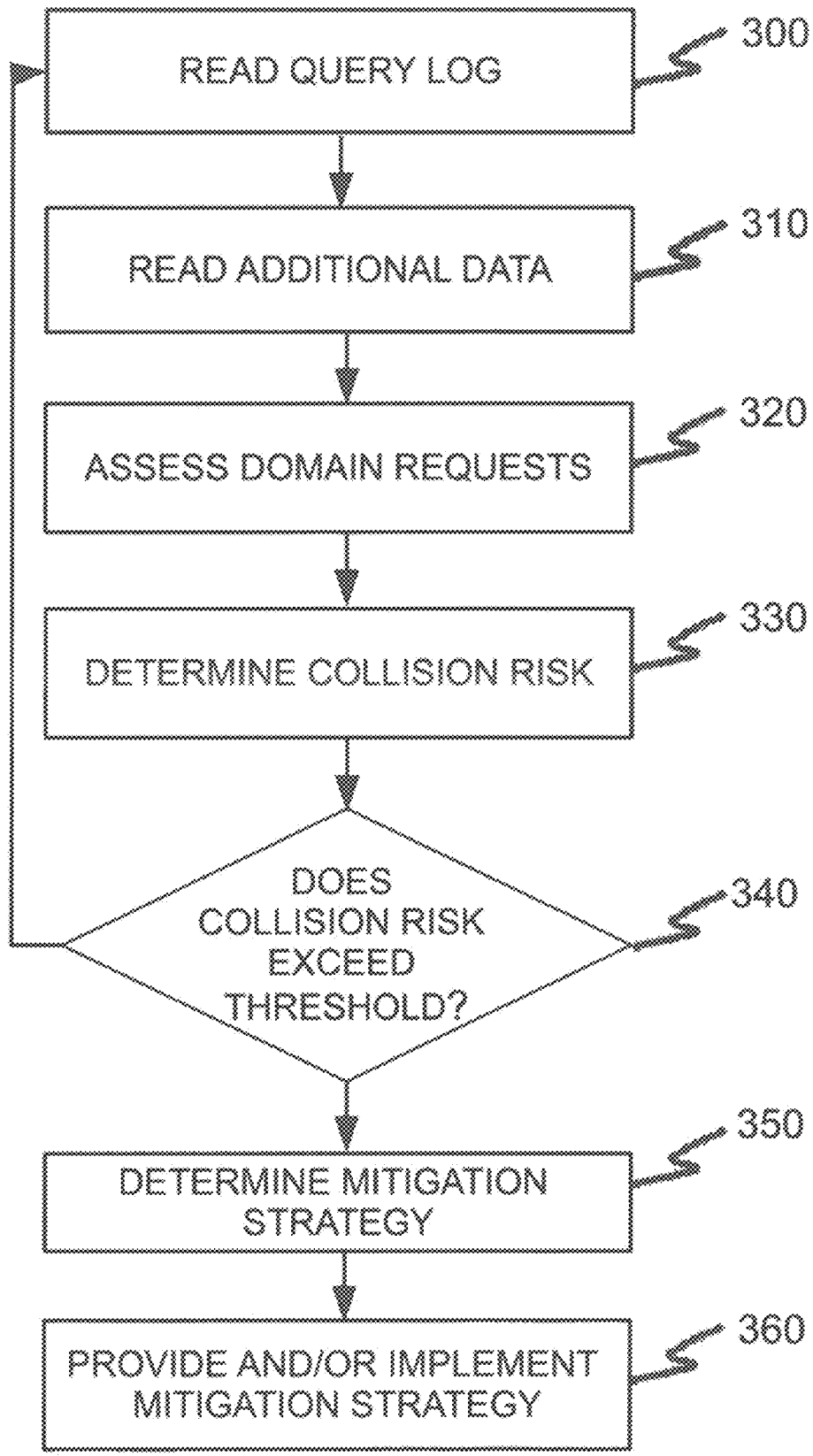
FIG. 3 is a flow diagram illustrating an example of a method of determining domain name collision risks and determining strategies to mitigate domain name collision risks, consistent with certain disclosed embodiments.

FIG. 3 is a flow diagram illustrating an example of a method of determining domain name collision risks and determining strategies to mitigate domain name collision risks, consistent with certain disclosed embodiments. In various implementations, the method can be performed on a computing device, such as, for example, a client device, a name server, or a risk management server.

The method shown in FIG. 3 can begin in 300, when the computing device reads a query log. For example, the query log can be a query log created using steps 110 and 130 shown in FIG. 1 and/or a query log similar to the one shown in table 200 in FIG. 2. As stated above, this method can be performed each time a request/response is added to the query log or can be performed in batches based on a predetermined time, a predetermined number of requests/responses, a specified event, etc.

In 310, the computing device can, in some embodiments, access and/or receive additional data. The additional data can include, for example, one or more query patterns. In various implementations, and as explained further below, a query pattern can be a rule or a data structure that includes one or more domain name strings (or parts thereof) and a type of use value associated with the one or more domain name strings. The domain name strings in the query pattern rule or data structure can be compared to one or more entries in a query log. If there is a match between the one or more domain name strings and the one or more entries in the query log, the type of use value can be applied to the one or more entries (described below in 320). In some embodiments, a query pattern that includes multiple domain name strings may also include time and/or sequence information associated with the multiple domain name strings, representing a sequence or a time period in which requests for the domain name strings must occur for there to be a match. A type of use value can be, for example: a binary value with one value representing that the pattern indicates an internal use and the other value indicating an external use, a numerical value (e.g., in a range of 0-100) representing a likelihood of internal use or external use, a variable indicating a type of use associated with the pattern (e.g., internal, external, miscellaneous), etc.

As used herein, an "external use" is a type of domain name resolution request that is intended to use the conventional, global DNS resolution process. For example, use of the .COM TLD would likely represent an external use because .COM is a well-known and widely-used global TLD.

As used herein, an "internal use" is a type of domain name resolution that is not intended to use the conventional, global DNS resolution process. For example, use of shorthand domain names, such as SERVER.CORP in the example described above, which are intended to be resolved locally within a particular domain.

In some embodiments, the query patterns can be determined by the computing system based on one or more query logs. In some particular embodiments, the computing system may analyze the information in a query log(s) (e.g., client IP address(es), domain name(s), response(s) and timestamp(s) as shown in FIG. 2) to search for, detect, identify, match, or otherwise recognize information or patterns of information in the query log that correspond to or match particular information or patterns of information specified or defined by a query pattern. For example, a query pattern can specify a reoccurring sequence of DNS requests for domain names with the same TLD from a single client device, and the DNS requests may consistently return NXDOMAIN responses. If this pattern of information is detected in a query log, the computing device can determine or output that the use of that particular TLD from that particular client device is for local resolution (i.e., internal use) because a reoccurring sequence of NXDOMAIN responses likely indicates that that particular TLD is used for retrieving a local/internal response by the client device. Information describing or specifying the reoccurring sequence can be stored on the computing device as part of a query pattern, and the query pattern can also include a type of use value or assessment value that indicates internal use and/or a higher likelihood of internal use, and which the computing device may output when the reoccurring sequence is detected (e.g., in column 430 of table 400). As another example, a query pattern might specify a reoccurring sequence of pairs of DNS requests, each pair consisting of requests for two domain names differing by the presence of a suffix only on the second DNS request, and the results being NXDOMAIN and positive (i.e., with an IP address) responses, for the first and second requests, respectively. The detection of this pattern in a query log might lead the computing device to determine or output that unqualified names intended for internal use are being used unsafely, being sent to name servers by stub resolvers, rather than being qualified by the stub resolver prior to querying the DNS server.

In various embodiments, the query patterns can be previously determined and received by the computing device as, for example, rules, data structures, a table, or a list of sequences. For example, the query patterns can be received from a name server, a risk management server, etc. In still further embodiments, a user can input one or more query patterns into, for example, a table or a list of sequences and input an associated type of use value.

In some embodiments, a query pattern can include a requirement that a request for a domain name string (or part thereof) occur as a repeated pattern of requests for the domain name string at or over some time interval. For example, a query pattern can include a pattern of requesting SERVER.CORP (e.g., from a single client device or multiple client devices) at regular intervals (e.g., every hour) and a type of use value that indicates a high likelihood of internal use and/or a low likelihood of external use. Such a periodicity of requests is interpreted to mean that the requests are automated requests that are intended to be local. Accordingly, if a new gTLD was created for .CORP, a domain name collision would, or at least could potentially, occur. Notably, the examples described herein can apply to any new TLD that has name collision risks, and .CORP should only be considered as an example.) Similar risks could also occur if a new ccTLDs was created. Accordingly, in embodiments discussed herein, examples generally stated in terms of gTLDs can also be applied to ccTLDs as well. In an alternate example, a query pattern can include a pattern of irregular intervals of requesting EXAMPLE.COM (e.g., from a single client device or multiple client devices) and a type of use value that indicates a low likelihood of internal use and/or a high likelihood of external use. In this example, the irregular intervals are interpreted to mean that the irregular requests are intended to be global requests.

In further examples, query patterns can include sequences of requests that include specific sequences of labels that may be indicative or characteristic of an internal request or an external request. For example, a sequence of WPAD.<*>.<gTLD>, ISATAP.<*>.<gTLD>, _UDP.<*>.<gTLD>, and _TCP.<*>.<gTLD> from the same client device, where <*> includes one or more labels and <gTLD> represents a common TLD, indicates that an application is performing service discovery. Service discovery is generally a process by which a computing device automatically detects devices and services available via a network. For example, the service discovery process can include transmitting local domain name resolution requests to automatically detect devices and services available in a local area network. Accordingly, a determination that the same pattern reoccurs can lead to the creation of a query pattern specifying the sequence, and the query pattern can include a type of use value that indicates a high likelihood of internal use. In various embodiments, the query pattern can be input by a user.

In further embodiments, a query pattern can specify a label (i.e., part of a domain name string) and a type of use value. In various embodiments, the label can be a particular TLD (e.g., .CORP and .COM), a second level domain (SLD), a lower level domain, or parts thereof. For example, a query pattern can specify that a .CORP label indicates a high likelihood of internal use, and this query pattern may be created because a user or system operator has knowledge that the .CORP TLD is in common and widespread use in local domain names.

Query patterns that include labels can be created based on, for example, user input or based on a previous observation and analysis of DNS traffic (e.g., periodicity of requests that including .CORP). An example of a previous observation is that if requests for a domain with a particular label (e.g. a TLD) reoccur at a certain periodicity, then they probably signify automated requests that are intended for local use if they are coming from the same client device or a group of client devices, and the requests were observed before a matching TLD was created globally. An additional example of a previous observation is that a brief high frequency of requests from a client device or from multiple client devices without recurrence indicates a high likelihood that the requests during that period are intended to be global.

In some embodiments, the labels can be associated with a certain position in a domain name string (e.g., a TLD, SLD, or lower-level domain), while, in further embodiments, because labels at various depths within domain names do not always co-align due to the hierarchical structure in which any entity may choose to encode or represent their endpoints (e.g. mail.tld versus mail.sub.tld), label frequency analysis can be performed independent of label position.

Alternatively, as an example, a query pattern can specify that a specific well-known and widely-used global TLD, such as .COM, has a type of use value that indicates a low likelihood of internal use.

In some embodiments, a query pattern can be specific to a single client device, while, in further embodiments, a query pattern can be for multiple client devices and/or for all requests/responses.

In other embodiments, a query pattern can be geographic-region-specific and can specify or associate, for example, a type of use value that indicates a high likelihood of external use of a particular string (e.g. domain name string, label, and/or n-gram) with requests from a specific region. Conversely, a query pattern may specify that requests not from the specific region are associated with a type of use value that indicates a lower likelihood of external use. In some implementations, such a query pattern can be generated based on observation and analysis of DNS traffic to make a determination that a regional affinity exists for a string. Regions associated with the request can be determined based on, for example, known locations of one or more name servers, known location of the client device, known location of the device that transferred the request to the computing device, etc.

In some embodiments, determining such regional affinity can require normalizing traffic for a domain name string, label, and/or n-gram across all of the regions requesting the string. For example, a percentage of queries for a string compared to all queries originating from a region can be determined using the equation:

$$i_R^S = \frac{q_R^S}{Q_R}$$

where R is the region, S is the string (e.g., domain name, label, and/or n-gram), $i_R^S$ is the proportion of queries for S from R, $q_R^S$ is the number of queries for S from R, and $Q_R$ is the total queries from R.

Using the percentage from the above equation, a baseline for the normal level of interest any domain name string, label, and/or n-gram should receive from a single region can be established. For example, using the equation:

$$I^S = \frac{\sum_{R=1}^{N} i_R^S}{N}$$

where $I^S$ is the average of the region proportions for a string and N is the number of regions that meet a minimum traffic threshold.

The average of region percentages can be compared to percentages for a region in question, and based on the standard deviation from the average of region percentages, a regional affinity or lack thereof can be determined. For example, if a percentage for a region is higher than one standard deviation from the average of region percentages, a determination can be made that a regional affinity exists for the string.

In some implementations, the additional data of 310 can include name space changes. Indications of name space changes can be received from, for example, authoritative name servers and/or input by a user. For example, a name space change can be indicated when a new gTLD is created and/or when a new SLD is registered.

In 320, the computing device can assess individual domain name resolution requests/responses. For example, the computing device can assess the last domain name resolution request/response that occurred, can assess all the requests/responses that are part of a current batch, etc. As shown in FIG. 4 and discussed in detail below, in some embodiments, the assessment of the domain name resolution requests can be included in a mitigation strategy represented as a table 400, as depicted in column 430.

In some embodiments, the computing device can parse into labels the domain names that are part of each request/response being assessed. The labels can then be compared to the query patterns independently and/or with labels from other requests/responses from the same client device that are in the query log (e.g., as a sequence of requests). In further embodiments, the computing device can perform the assessment on the entire domain name and/or on parsed n-grams.

The computing device can assess or determine if the domain name or other information recorded for one or more requests/responses match or corresponds to a query pattern. Based on the determination, the computing device can assign a type of use value to the requests/responses. In some implementations, the query pattern may specify the appropriate type of use value to assign. For example, the computing device can determine that a set of domain name strings in a sequence of requests matches a sequence of domain name strings in a query pattern that includes a type of use value that indicates internal use and/or a higher likelihood of internal use. In some embodiments, a type of use value can be assigned to each request/response.

In some embodiments, request and/or set of requests may correspond to more than one query pattern, and the computing device can sum or otherwise process all the type of use values determined for a request and/or set of requests and determine a total type of use value for the request and/or set of requests. The type of use value can be the sum total, can be set to a particular binary value based on the process, can be assigned a specific variable based on the process, etc.

In 330, the computing device can determine a name collision risk for one or more client devices. In some embodiments, based on the type of use values determined in 320 and/or any changes to the name space or other additional information, the computing device can assign a name collision risk value to each client devices or to groups of client devices and/or can assign a name collision risk value to each domain name resolution request. For example, a client device that transmitted one or more domain name resolution requests that were assigned a type of use value that indicates internal use and/or a higher likelihood of internal use can be assigned a higher name collision risk value and/or the name collision risk value can be increased.

A name collision risk value can be, for example: a binary value with one value representing a risk of name collision and the other value representing lack of such a risk, a numerical value (e.g., in a range of 0-100) representing a level of name collision risk, a variable indicating the level of name collision risk (e.g., low, medium, and high), etc.

As an example, the computing device can associate requests that include a new globally created gTLD (determined from the received changes to the name space) with a high name collision risk value and/or increase the name collision risk value. In particular, if the computing device determined that a client device requested the new gTLD prior to its global creation (e.g., from a past query log), the computing device can associate requests from that client device that include the new globally created gTLD with an even higher collision risk value and/or further increase the name collision risk value. In a similar example, if the computing device monitors a request by a second client device that includes the same new gTLD, and the second client device did not attempt to resolve domain names with the new gTLD prior to the creation of the new global gTLD (e.g., from past query logs), then the computing device can associate requests by the second client device that include the new gTLD with a lower collision risk than the first client device, not increase the name collision risk value, and/or lower the name collision risk value.

As an additional example, if the computing device determines that requests for a particular TLD from a client device are associated with a type of use value that indicates a high likelihood of internal use (e.g., in 320) and determines that a new global gTLD is created that matches that TLD (e.g. from the received changes to the name space), then the computing device can associate requests by the client device that include the new gTLD with a high name collision risk value and/or increase the name collision risk value.

As a further example, if the computing device determines that requests from a particular client device are associated with a type of use value that indicates a high likelihood of internal use (e.g., in 320) and determines that the requests are being resolved globally (e.g., from the query log), the computing device can associate the requests with a high name collision risk value and/or increase the name collision risk value.

In 340, the computing device can determine whether a name collision risk value exceeds a threshold. The threshold can be, for example, predetermined and/or set by a user. In various embodiments, the name collision risk value can be for individual requests, for a set of requests for a particular client device, for all requests in a batch for a particular client device, or a running total for a particular client device. For example, the name collision risk value can be a binary value with the value representing that there is a risk of name collision, a numerical value that meets or exceeds a threshold value, a variable indicating the level of name collision risk is medium or high, etc. If the name collision risk value is determined to meet or exceed the threshold for a particular client device or a group of client devices associated with the respective requests, then the computing device can proceed to 350. Otherwise, the computing device can proceed to 300 and repeat 300-340 with the next request/response and/or next batch of requests/responses.

In 350, the computing device can determine a mitigation strategy. For example, referring now to FIG. 4 as well as FIG. 3, the computing device can add an entry for the domain name resolution request/response in a mitigation strategy table 400, and the entry can include information such as, but not limited to, the IP address of the requester (column 410), the domain name being requested (column 420), an assessment of the request/response (e.g., a type of use) (column 430), and a proposed action (column 440), which in this example represents the DNS resolution processing change (if any) that was chosen or otherwise determined for each resolution request/response. The table can be part of the query log 200 or can be a separate table 400.

In some embodiments, the assessment 430 of the request/response can be a type of use value determined in 320 and associated with the request and/or determined based on a query pattern. In various implementations, the assessment 430 can be a binary value, a numerical value, or a variable (e.g., external use, internal use, miscellaneous).

In some implementations, the proposed action 440 can be determined based on the name collision risk value, perhaps in association with other information such as the assessment 430 value—i.e., the type of use. In various implementations, domain name resolution requests with higher name collision risk values, name collision risk values that exceed the threshold described above (340), and/or type of use values that indicate internal use can be assigned a proposed action that mitigates potential name collision risks. Conversely, domain name resolution requests with lower name collision risk values, name collision risk values that do not exceed the threshold described above (340), and type of use values that indicate external use can be assigned no proposed action and/or instructions not to change current procedures.

For example, the proposed action 440 can be no action when an assessment (430) of a request/response is external use because external use may result in a low name collision risk value for the request/response. Alternately, the proposed action 440 of a request/response can be to reserve the domain name when an assessment (430) of the request response is internal use because internal use (e.g., in addition to a change in name space) may result in a high name collision risk value for the request/response. A proposed action 440 of reserving a domain name can represent taking action to prevent a domain name from being resolved globally and/or to resolve a domain name locally.

In 360, the computing device can implement the strategy for mitigating domain name collisions that was determined in 350. In some embodiments, implementing the mitigation strategy can include transferring the mitigation strategy (e.g., as part of a risk report) and/or providing recommendations to change internal configurations and/or processes to the relevant client device or to an administrator associated with the client device. In other embodiments, implementing the mitigation strategy can include reserving the domain name for local use only if the action 440 is "reserve" for internal use and the computing device is the client device and/or is local to the client device. In further embodiments, if the action 440 is an action for preventing collisions between a particular local domain name that coincides with a global domain name, then implementing the mitigation strategy can include, not resolving the global request for that domain name, returning NXDOMAIN in response to the request, not transferring the request to a DNS name server, and/or providing instructions to not resolve or transfer the request if the computing device is remote to the client device. In additional implementations, implementing the mitigation strategy can include selecting and routing domain name resolution requests to an alternative recursive name server that can further implement and/or is configured to implement mitigation strategies. For example, a client device can transmit domain name resolution requests to the alternative recursive name server, the network device can route domain name resolution requests to the alternative recursive name server, the current recursive name server can route domain name resolution requests to the alternative recursive name server, etc.

In some embodiments, if the action 440 is an action for preventing collisions between a particular local domain name that coincides with a global domain name (e.g., "reserve" for internal use), implementing the mitigation strategy can include changing the way requests to resolve the domain name are processed by the DNS. One example of such a DNS resolution processing change is creating, specifying changes in, or making changes in a Response Policy Zone (RPZ) file or other similar information that directs a DNS recursive name server to filter traffic in ways that reduce the risk of domain name collisions. For example, if a client device regularly uses .EXAMPLE as a domain name suffix internally, the RPZ file could include rules for returning NXDOMAIN in response to requests with the .EXAMPLE suffix rather than resolve such requests from the global DNS.

In further embodiments, implementing the mitigation strategy can include the computing device creating and transferring a risk report that includes the mitigation strategy. In some embodiments, the risk report can include all or part of table 400. The risk report can also include, for example, recommendations on configurations to adjust, "what if" scenarios that can assist client devices in preemptively preventing internal requests from leaving the local network by describing patterns associated with internal requests, and data on the effectiveness of remediation efforts (e.g., comparing risk levels before and after mitigation actions are taken).

While the operations depicted in FIG. 3 have been described as performed in a particular order, the order described is merely exemplary, and various different sequences of operations can be performed, consistent with certain disclosed embodiments. Additionally, the operations are described as discrete operations merely for the purpose of explanation, and, in some embodiments, multiple operations may be performed simultaneously and/or as part of a single computation. Further, the operations described are not intended to be exhaustive or absolute, and various operations can be inserted or removed.

FIG. 4 is a diagram depicting an example of a mitigation strategy embodied in a data structure, consistent with certain disclosed embodiments. In particular, as noted above with respect to FIG. 3, FIG. 4 depicts a table 400 that includes four entries in rows. Each entry represents a domain name resolution request and/or response. For example, table 400 can represent a table created during operations 320 and 350 shown in FIG. 3.

Table 400 includes four columns, each containing or representing information associated with a domain name resolution request/response. Column 410 represents the IP address of a client device that requested the DNS resolution. The IP address of the client device can be determined from information in the request (e.g., the source IP address included in the request) or the response (e.g., the destination IP address included in the response). In the example shown in table 400, the first two entries represent a client device with the IP address 192.0.2.10 and the last two entries represent a client device with the IP address 192.0.2.20. More generally, in addition to rules associated with individual client IP addresses, the mitigation strategy could be expressed in terms of sets of client IP addresses, e.g., a subnet, an autonomous system, and/or a region.

Column 420 represents the domain name associated with the request/response. The domain name can be determined from information in the request (e.g., the source IP address included in the request). In other embodiments, the domain name may also be determined based on the response (e.g., the destination IP address included in the response). In the example shown in table 400, IP address 192.0.2.10 transmitted two domain name resolution requests, one for WWW.EXAMPLE.COM and one for WWW.EXAMPLE. IP address 192.0.2.20 also transmitted two domain name resolution requests, one for WPAD.SERVER1.EXAMPLE and one for WPAD.SERVER2.EXAMPLE.

Column 430 represents an assessment of the requests. The assessments can be determined, for example, as discussed above in reference to 320 shown in FIG. 3.

In the example shown in table 400, the request for the IP address associated with WWW.EXAMPLE.COM has been determined to likely represent an intended global request (i.e., as indicated by "external use" in column 430). For example, the assessment can be made by matching the TLD of the domain name .COM to a query pattern that includes the .COM TLD and a type of use value that indicates external use. The query pattern for the TLD .COM may have been previously created because the .COM TLD is a known, well-established, reserved, and widely-used global TLD.

As shown in the third row of the table 400, the request for the IP address associated with WWW.EXAMPLE has been determined to likely represent a miscellaneous use, which may include an unintended use (e.g., an error) in some implementations. For example, the assessment can be made by determining that the domain uses the TLD .EXAMPLE, which is not established in the global DNS, does not match any query patterns, is not associated with service discovery, and/or does not regularly occur, and this assessment may be encoded in a query pattern that identifies domain names that use the TLD .EXAMPLE.

As shown in the fourth and fifth rows of the table 400, the requests for the IP addresses associated with WPAD.SERVER1.EXAMPLE and WPAD.SERVER2.EXAMPLE have been determined to likely represent an intended local use (i.e., internal use as shown in column 430). In some embodiments, the assessment can be made by matching the requests to domain name(s) or parts thereof in a query pattern. For example, a query pattern can include multiple domain name resolution requests that use a TLD not established in the global DNS and a type of use value that indicates internal use. As an additional example, a query pattern can include domain name resolution requests with the lower level domain WPAD and a type of use value that indicates internal use. Such a query pattern could be created in response to reoccurring requests for the lower level domain WPAD and the TLD .EXAMPLE from the same IP address. The query pattern could be used to match all domain name resolution requests or a sequence of two DNS requests that include the lower level domain WPAD and assess them as internal use.

In some embodiments, based on the determination regarding WPAD.SERVER1.EXAMPLE and WPAD.SERVER2.EXAMPLE, a computing device may extrapolate that pattern and also determine that, for example, the domain name WPAD.SERVER3.EXAMPLE, if observed, can also be assessed for local use. Accordingly, a query pattern can be created that includes the domain name string WPAD.SERVER<*>.EXAMPLE and a type of use value that indicates internal use.

Column 440 labeled "Action" represents a proposed mitigation strategy or action (e.g., a DNS resolution processing change) associated with each request/response. The mitigation strategy action can be determined, for example, as discussed above in reference to 350 shown in FIG. 3. In some embodiments, the data from the mitigation strategy or action column 440, table 400, and/or additional information regarding name collision risks and mitigation strategies can be included in a risk report that can, for example, be transmitted to a client device when a high risk of name collision is determined (e.g., as described with respect to 340 shown in FIG. 3).

In the example shown in the second row of table 400, any request for the IP address associated with WWW.EXAMPLE.COM is associated with an action of "no change" to the configurations or processes of a name server and/or a client device; or in other words, there is no change to the conventional DNS resolution processing and no mitigation strategy for this domain name. In various embodiments, the strategy or lack thereof can be determined because the assessment that the request was intended for external use (as indicated by "external use" in column 430) resulted in a low risk of domain name collision value being determined, and, therefore, an action of no change was determined for the request/response. Similarly, as shown in column 440 for the third row of table 400, the request for the IP address associated with WWW.EXAMPLE is associated with a strategy of "no change" to the configurations or processes of a name server and/or client device. For example, the strategy or lack thereof can be determined because the assessment that the request was intended for miscellaneous use and/or was likely an error resulted in a low risk of domain name collision value being determined, and, therefore, an action of no change was determined for the request/response. In some embodiments, if the only requests associated with a client IP address, (such as the client IP address 192.0.2.10), in a current batch are associated with no mitigation strategy, a strategy of no change, an assessment of external use, an assessment of miscellaneous use, and/or with no high likelihood of name collision, no risk report may be generated, no mitigation strategy may be determined, no risk report may be transferred to the client device associated with the 192.0.2.10 client IP address requests, and/or no mitigation steps may be performed by a name server for requests from that client device.

In the example shown in the fourth and fifth rows of table 400, the requests for the IP addresses associated with WPAD.SERVER1.EXAMPLE and WPAD.SERVER2.EXAMPLE are associated with a mitigation strategy of "RESERVE" as shown in column 440. For example, this strategy can be determined because the assessments in column 430 that the requests were intended for local use, possibly in combination with a change in the name space, resulted in a high risk of domain name collision value being determined, and, therefore, an action of "RESERVE" was determined for the request/response. In some embodiments, the "RESERVE" action/strategy can mean that a name server will not perform conventional DNS resolution processing, but instead will treat the domain name as "reserved" for the Client IP address associated with the request (e.g., 192.0.2.20 as shown in column 410). In particular to implement this, the name server may be configured to lookup the client IP address (column 410) and the domain name (column 420) of DNS resolution requests, and if they match those of rows four or five of table 400, then to provide "NXDOMAIN" responses because column 440 indicates "RESERVE," which will avoid name collisions even if the global name space changes such that WPAD.SERVER1.EXAMPLE and/or WPAD.SERVER2.EXAMPLE are legitimate global domain names. In other embodiments, the mitigation strategy in column 440 of table 400, and/or a risk report can be transferred to the client device and/or an administrator associated with the client device if at least one request from the client device is associated with a mitigation strategy of any sort, a strategy of RESERVE, an assessment of internal use, and/or with a high likelihood of name collision.

While table 400 shows a particular storage architecture and information, such architecture and information is merely exemplary and different storage types, data structures, and methods may be used, and different information associated with the requests and/or responses may be entered, in various configurations consistent with disclosed embodiments.

Figure 5:
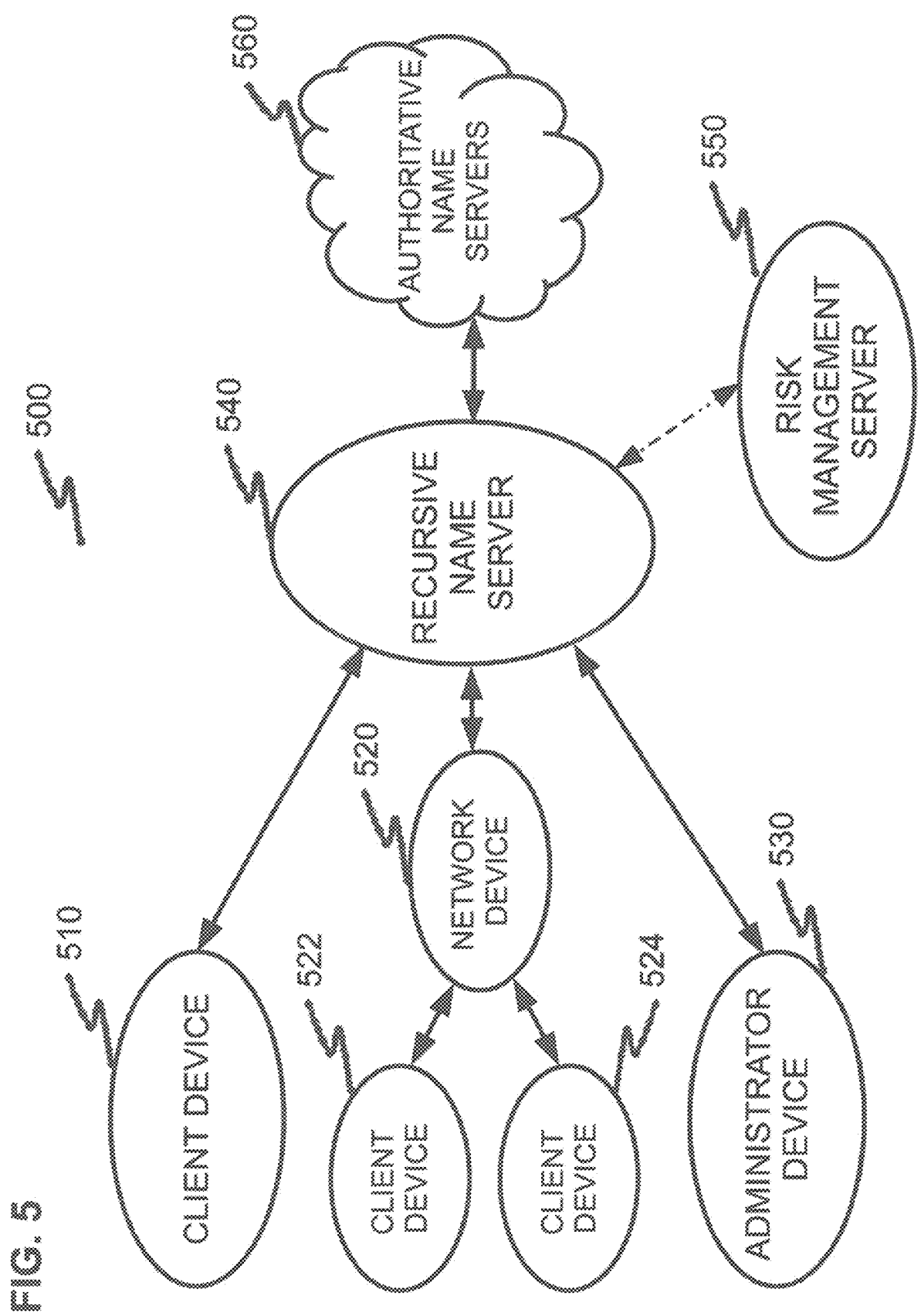
FIG. 5 is a diagram depicting an example of a DNS schematic, consistent with certain disclosed embodiments.

FIG. 5 is a diagram depicting an example of a DNS schematic, consistent with certain disclosed embodiments. In particular, FIG. 5 depicts a domain name system 500, including a client device 510, a network device 520, and an administrator device 530 that can all be in communication with recursive a name server 540 via, for example, the Internet (not shown). Client devices 522 and 524 can be in communication with network device 520 as part of a local area network (not shown). Client devices 522 and 524 can also be in communication with recursive name server 540 via network device 520.

In some embodiments, client devices 510, 522, and 524 can represent client devices that initially request a domain name resolution. For example, client devices 510, 522, and 524 can represent client devices as discussed above for FIGS. 1-4. In some embodiments, client devices 510, 522, and 524 can perform the methods and systems as described herein. For example, client devices 510, 522, and 524 can maintain and/or access query logs 570, receive indications of name space changes, create and/or receive query patterns, assess types of use for individual or groups of domain name requests/responses, determine domain name collision risks, receive risk reports, and/or determine and/or implement name collision mitigation strategies 580.

In further embodiments, network device 520 can represent a client device that does not initially request a domain name resolution, but, instead, forwards domain name resolutions from client devices 522 and 524 to recursive name server 540. In some embodiments, network device 520 can also be configured to resolve local domain requests and/or transfer local domain requests to a local area network resolver. In some embodiments, network device 520 can perform the methods and systems as described herein. For example, network device 520 can maintain and/or access query logs 570, create and/or receive query patterns, receive indications of name space changes, assess types of use for individual or groups of domain name requests/responses, determine domain name collision risks, receive risk reports, and/or determine and/or implement name collision mitigation strategies 580.

In some implementations, administrator device 530 can be a device that administers one or more client devices and/or one or more local area networks. For example, administrator device 530 can be a device operated by a third-party technical support company. In some embodiments, administrator device 530 may not communicate directly with recursive name server 540 but can receive reports from recursive name server 540 and/or risk management server 550 via, for example, other recursive name servers and/or authoritative name servers. In some embodiments, administrator device 530 can perform the methods and systems as described herein. For example, network device can receive risk reports and/or mitigation strategies 580 and implement the name collision mitigation strategies 580.

In various embodiments, recursive name server 540 may be a name server that receives domain name resolution requests. Recursive name server 540 may maintain a cache of domain names and associated IP addresses (or more generally, DNS resource records including DANE records) based on previous requests/responses that have been transferred through recursive name server 540. For example, recursive name server 540 may receive a domain name resolution request for EXAMPLE.COM. Recursive name server 540 may check its cache for the associated IP address. If the associated IP address is found in the cache, recursive name server 540 can return a response to the request with the IP address. If the associated IP address is not found in the cache, recursive name server can transfer the request to an authoritative name server (e.g., authoritative name servers 560) for the domain name. If a response is received, recursive name server can cache the response and then forward the response to the requestor. In some embodiments, recursive name server 540 can perform the methods and systems as described herein. For example, recursive name server 540 can maintain and/or access query logs 570, create and/or receive query patterns, receive indications of name space changes, assess types of use for individual or groups of domain name requests/responses, determine domain name collision risks, generate and/or receive risk reports, and/or determine and/or implement name collision mitigation strategies 580.

The risk management server 550 can represent a server that maintains or accesses query logs 570 (e.g., as shown in FIG. 2), creates and/or receives query patterns (e.g., 310), receives indications of name space changes (e.g., 310), assesses types of use for individual or groups of domain name requests/responses (e.g., 320 and column 430), determines domain name collision risks (e.g., 330), determines mitigation strategies (e.g., 350 and as shown in FIG. 4), implements mitigation strategies 580 (e.g., 360), and/or generates and transfers risk reports.

In some embodiments, risk management server 550 can be a separate server, as depicted in FIG. 5. In such embodiments, risk management server 550 can receive indications and information associated with domain name resolution requests/responses, either individually or as batches, from, for example, recursive name server 540, network device 520, and/or client device 510. In other embodiments, risk management server 550 can be an application that runs on, for example, recursive name server 540, network device 520, client device 510, etc. In such embodiments, risk management server 550 may also be able to change configurations and processes of the device, as discussed above. For example, the application can change the conventional DNS resolution processing of a recursive name server so as to first check a list of reserved domain names after receiving a domain name resolution request and prior to retrieving an IP address for the domain name in its local cache or transferring the request to an authoritative name server. If the domain name in the request is in the list of reserved domain names, the recursive name server can be configured to transfer an NXDOMAIN response to the request. In addition, the risk management server can provide mitigation strategies 580 for use by authoritative name servers 560 and/or by the operators of proposed new gTLDs to mitigate risks, e.g., by partially or fully blocking the delegation and/or resolution of domain names that are consistently assessed as having high risk, globally, regionally, and/or for requests from specific recursive name servers 540. This would complement the use of the mitigation strategies 580 by specific recursive name servers 540 and/or by other control points.

The example depicted in FIG. 5 is merely for the purpose of illustration, and is not intended to be limiting. For example, additional client devices, network devices, administrator devices, name servers, and risk management servers may be used as part of a DNS. Additionally, although query log 570 and mitigation strategies 580 are depicted as separate from and connected to risk management server 550, query log 570 and mitigation strategies 580 can be stored on remote devices or can be data stored on risk management server. In other embodiments, query log 570 and mitigation strategies 580 can be stored on or connected to, for example, client devices 510, 522, and 524, network device 520, and/or recursive name server 540. In addition, query logs 570 and mitigation strategies 580 can also be shared among multiple instances of risk management servers 550 connected to the same or different sets of client devices 510, 522, 524, network devices 520, and/or recursive name servers 540. Further, the DNS structure depicted and processes described are merely a simplified example of a DNS and name collision risk management, consistent with certain disclosed embodiments, but such an example is not intended to be limiting.

Figure 6:
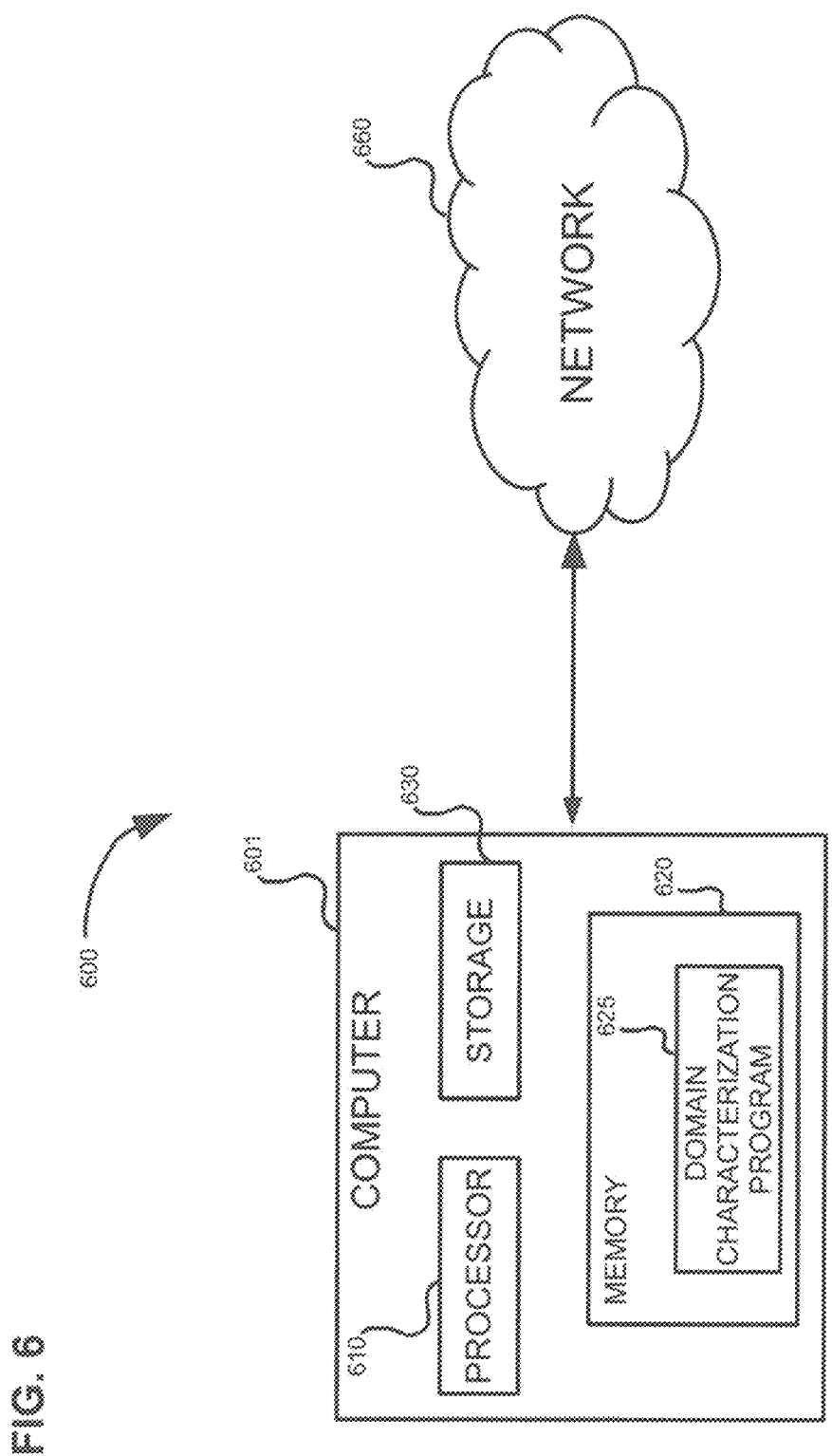
FIG. 6 is a diagram illustrating an example of a hardware system for assessing domain name resolution requests, determining name collision risks, determining mitigation strategies, implementing mitigation strategies, and/or generating risk reports, consistent with certain disclosed embodiments.

FIG. 6 is a diagram illustrating an example of a hardware system 600 for assessing domain name resolution requests, determining name collision risks, determining mitigation strategies, implementing mitigation strategies, and/or generating risk reports, consistent with certain disclosed embodiments. The example system 600 includes example system components that may be used. The components and arrangement, however, may be varied.

A computer 601 may include a processor 610, a memory 620, storage 630, and input/output (I/O) devices (not pictured). The computer 601 may be implemented in various ways and can be configured to perform any of the embodiments described above. For example, the computer 601 may be a general purpose computer, a mainframe computer, any combination of these components, or any other appropriate computing device. The computer 601 may be standalone, or may be part of a subsystem, which may, in turn, be part of a larger system.

In some embodiments, the computer 601 can implement, for example, client device 510, network device 520, recursive name sever 540, or risk management server 550, as shown in FIG. 5.

The processor 610 may include one or more known processing devices, such as a microprocessor from the Intel Core™ family manufactured by Intel™, the Phenom™ family manufactured by AMD™, or the like. Memory 620 may include one or more storage devices configured to store information and/or instructions used by processor 610 to perform certain functions and operations related to the disclosed embodiments. Storage 630 may include a volatile or non-volatile, magnetic, semiconductor, tape, optical, removable, non-removable, or other type of computer-readable medium used as a storage device. In some embodiments, storage 630 can store tables 200 and 400.

In one embodiment, memory 620 may include one or more programs or subprograms including instructions that may be loaded from storage 630 or elsewhere that, when executed by computer 601, perform various procedures, operations, or processes consistent with disclosed embodiments. For example, memory 620 may include a risk management program 625 for assessing domain name resolution requests, determining name collision risks, determining mitigation strategies, implementing mitigation strategies, and/or generating risk reports according to various disclosed embodiments. Memory 620 may also include other programs that perform other functions, operations, and processes, such as programs that provide communication support, Internet access, etc. The risk management program 625 may be embodied as a single program, or alternatively, may include multiple sub-programs that, when executed, operate together to perform the function of the risk management program 625 according to disclosed embodiments. In some embodiments, risk management program can perform the processes of FIGS. 1 and 3, described above.

The computer 601 may communicate over a link with a network 660. For example, the link may be a direct communication link, a local area network (LAN), a wide area network (WAN), or other suitable connection. The network 660 may include the internet, as well as other networks, which may be connected to various systems and devices.

The computer 601 may include one or more input/output (I/O) devices (not pictured) that allow data to be received and/or transmitted by the computer 601. I/O devices may also include one or more digital and/or analog communication I/O devices that allow the computer 601 to communicate with other machines and devices. I/O devices may also include input devices such as a keyboard or a mouse, and may include output devices such as a display or a printer. The computer 601 may receive data from external machines and devices and output data to external machines and devices via I/O devices. The configuration and number of input and/or output devices incorporated in I/O devices may vary as appropriate for various embodiments.

Example uses of the system 600 can be described by way of example with reference to the example embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A computer-implemented method, comprising:
accessing a sequence of domain name resolution requests;
comparing a pattern corresponding to the sequence of domain name resolution requests to a predetermined plurality of query patterns, wherein each query pattern of the predetermined plurality of query patterns represents a plurality of queries and is associated with a type of use value, wherein the type of use value comprises internal, external, or miscellaneous, wherein each query pattern of the predetermined plurality of query patterns comprises at least a portion of at least one domain name string, wherein at least one query pattern of the predetermined plurality of query patterns represents a plurality of domain name resolution requests from a client device;
determining, using one or more processors, that the pattern corresponds to a query pattern of the predetermined plurality of query patterns;
assigning the type of use value associated with the query pattern to a domain name resolution request of the sequence of domain name resolution requests;
determining a name collision risk value for the domain name resolution request of the sequence of domain name resolution requests based on the type of use value assigned to the domain name resolution request;
determining a name collision mitigation strategy based on the name collision risk value for the domain name resolution request, the name collision mitigation strategy comprising one of resolving the domain name resolution request, reserving a domain name string corresponding to the domain name request for local resolution, or routing the domain name resolution request to an alternative name server; and implementing the name collision mitigation strategy.

2. The computer-implemented method of claim 1, wherein accessing the sequence of domain name resolution requests comprises accessing a query log, wherein the query log is populated by monitoring domain name resolution requests and responses.

3. The computer-implemented method of claim 1, wherein the sequence of domain name resolution requests comprises a plurality of domain name resolution requests and responses.

4. The computer-implemented method of claim 1, wherein:
the query pattern includes a geographic region;
a region of a client device associated with the domain name resolution request is determined to match the geographic region; and
determining that the pattern corresponds to the query pattern comprises determining that the geographic region matches the region of the client device.

5. The computer-implemented method of claim 1, further comprising:
determining that the name collision risk value exceeds a threshold, and
wherein determining the name collision mitigation strategy based on the name collision risk value comprises:
determining the name collision mitigation strategy in response to determining that the name collision risk value exceeds the threshold.

6. The computer-implemented method of claim 1, further comprising:
receiving an indication of a change in name space; and
determining the name collision risk value corresponds to a high name collision risk based on determining a client device associated with the domain name resolution request requested a domain name string or a portion thereof corresponding to the domain name resolution request prior to the change in name space.

7. The computer-implemented method of claim 1, further comprising:
generating a risk report comprising the name collision mitigation strategy.

8. The computer-implemented method of claim 1, wherein the name collision mitigation strategy comprises reserving a domain name string corresponding to the domain name request for local resolution, wherein the reserving the domain name string corresponding to the domain name request for local resolution comprises adding the domain name string to a list of reserved domain names, the method further comprising:
accessing information corresponding to a second domain name resolution request, wherein the information comprises the domain name string;
comparing the domain name string to the list of reserved domain names; and
resolving the domain name string locally based on determining the domain name string is in the list of reserved domain names.

9. The computer-implemented method of claim 1, wherein reserving the domain name string for local resolution comprises adding the domain name string to a list of reserved domain names, the method further comprising:
accessing information corresponding to a second domain name resolution request, wherein the information comprises the domain name string;
comparing the domain name string to the list of reserved domain names; and
transmitting a domain name resolution response comprising a non-existent domain error based on determining the domain name string is in the list of reserved domain names.

10. The computer-implemented method of claim 1, wherein each query pattern of the predetermined plurality of query patterns corresponds to a pattern of requests for domain name strings during a specified time interval.

11. The computer-implemented method of claim 1, wherein each domain name resolution request in the sequence of domain name resolution requests is associated with a domain name string, and each domain name string in the sequence of domain name resolution requests comprises a same label.

12. The computer-implemented method of claim 11, wherein the same label is a top-level domain.

13. The computer-implemented method of claim 1, wherein the type of use value indicates a quantitative likelihood that a query pattern of the plurality of query patterns is internal, external, or miscellaneous.

14. The computer-implemented method of claim 1, wherein the client device is a single client device.

15. The computer-implemented method of claim 1, wherein at least one query pattern of the predetermined plurality of query patterns represents a plurality of domain name resolution requests from a single client device.

16. A system comprising:
a processing system of a device comprising one or more processors; and
a memory system comprising one or more computer-readable media, wherein the one or more computer-readable media contain instructions that, when executed by the processing system, cause the processing system to perform operations comprising:
accessing a sequence of domain name resolution requests;
comparing a pattern corresponding to the sequence of domain name resolution requests to a predetermined plurality of query patterns, wherein each query pattern of the predetermined plurality of query patterns represents a plurality of queries and is associated with a type of use value, wherein the type of use value comprises internal, external, or miscellaneous, wherein each query pattern of the predetermined plurality of query patterns comprises at least a portion of at least one domain name string, wherein at least one query pattern of the predetermined plurality of query patterns represents a plurality of domain name resolution requests from a client device;
determining that the pattern corresponds to a query pattern of the predetermined plurality of query patterns;
assigning the type of use value associated with the query pattern to a domain name resolution request of the sequence of domain name resolution requests;
determining a name collision risk value for the domain name resolution request of the sequence of domain name resolution requests based on the type of use value assigned to the domain name resolution request;
determining a name collision mitigation strategy based on the name collision risk value for the domain name resolution request, the name collision mitigation strategy comprising one of resolving the domain name resolution request, reserving a domain name string corresponding to the domain name request for local resolution, or routing the domain name resolution request to an alternative name server; and implementing the name collision mitigation strategy.

17. The system of claim 16, wherein:

the query pattern includes a geographic region;

a region of a client device associated with the domain name resolution request is determined to match the geographic region; and determining that the pattern corresponds to the query pattern comprises determining that the geographic region matches the region of the client device.

18. The system of claim 16, wherein the name collision mitigation strategy comprises reserving a domain name string corresponding to the domain name request for local resolution, wherein the reserving the domain name string corresponding to the domain name request for local resolution comprises adding the domain name string to a list of reserved domain names, the operations further comprising:

accessing information corresponding to a second domain name resolution request, wherein the information comprises the domain name string;

comparing the domain name string to the list of reserved domain names; and resolving the domain name string locally based on determining the domain name string is in the list of reserved domain names.

19. The system of claim 16, wherein reserving the domain name string for local resolution comprises adding the domain name string to a list of reserved domain names, the operations further comprising:

accessing information corresponding to a second domain name resolution request, wherein the information comprises the domain name string;

comparing the domain name string to the list of reserved domain names; and transmitting a domain name resolution response comprising a non-existent domain error based on determining the domain name string is in the list of reserved domain names.

20. A non-transitory computer readable storage medium comprising instructions for causing one or more processors to:

access a sequence of domain name resolution requests;

compare a pattern corresponding to the sequence of domain name resolution requests to a predetermined plurality of query patterns, wherein each query pattern of the predetermined plurality of query patterns represents a plurality of queries and is associated with a type of use value, wherein the type of use value comprises internal, external, or miscellaneous, wherein each query pattern of the predetermined plurality of query patterns comprises at least a portion of at least one domain name string, wherein at least one query pattern of the predetermined plurality of query patterns represents a plurality of domain name resolution requests from a client device;

determine that the pattern corresponds to a query pattern of the predetermined plurality of query patterns;

assign the type of use value associated with the query pattern to a domain name resolution request of the sequence of domain name resolution requests;

determine a name collision risk value for the domain name resolution request of the sequence of domain name resolution requests based on the type of use value assigned to the domain name resolution request;

determine a name collision mitigation strategy based on the name collision risk value for the domain name resolution request, the name collision mitigation strategy comprising one of resolving the domain name resolution request, reserving a domain name string corresponding to the domain name request for local resolution, or routing the domain name resolution request to an alternative name server; and implement the name collision mitigation strategy.

21. The non-transitory computer readable storage medium of claim 20, wherein the name collision mitigation strategy comprises reserving a domain name string corresponding to the domain name resolution request for local resolution.

* * * * *